United States Patent [19]
Gillette et al.

[11] 3,861,481
[45] Jan. 21, 1975

[54] HYDROSTATIC DRIVE ARRANGEMENT FOR VEHICLES

[75] Inventors: Roy A. Gillette; Maurice Klee, both of Burlington, Iowa

[73] Assignee: J. I. Case Company, Racine, Wis.

[22] Filed: Aug. 10, 1973

[21] Appl. No.: 387,292

[52] U.S. Cl............... 180/6.48, 74/720.5, 180/44 F
[51] Int. Cl............................................. B62d 11/02
[58] Field of Search ........ 180/6.48, 6.5, 44 E, 44 F, 180/44 M; 74/720.5

[56] References Cited
UNITED STATES PATENTS

| | | | |
|---|---|---|---|
| 2,446,242 | 8/1948 | Orshansky | 180/6.48 |
| 3,279,637 | 10/1966 | Olson et al. | 180/6.48 X |
| 3,605,519 | 9/1971 | Heggen | 180/6.48 X |
| 3,702,642 | 11/1972 | Greene | 180/44 M |

*Primary Examiner*—M. Henson Wood, Jr.
*Assistant Examiner*—Gene A. Church
*Attorney, Agent, or Firm*—Dressler, Goldsmith, Clement & Gordon, Ltd.

[57] ABSTRACT

The invention disclosed herein relates to a drive mechanism for a vehicle of the skid-steer type. The drive mechanism includes a pair of fluid motors each of which are connected to an associated front wheel of the vehicle through a planetary gear arrangement and the back wheels are driven directly from the front wheels through endless chains.

4 Claims, 3 Drawing Figures

PATENTED JAN 21 1975
3,861,481
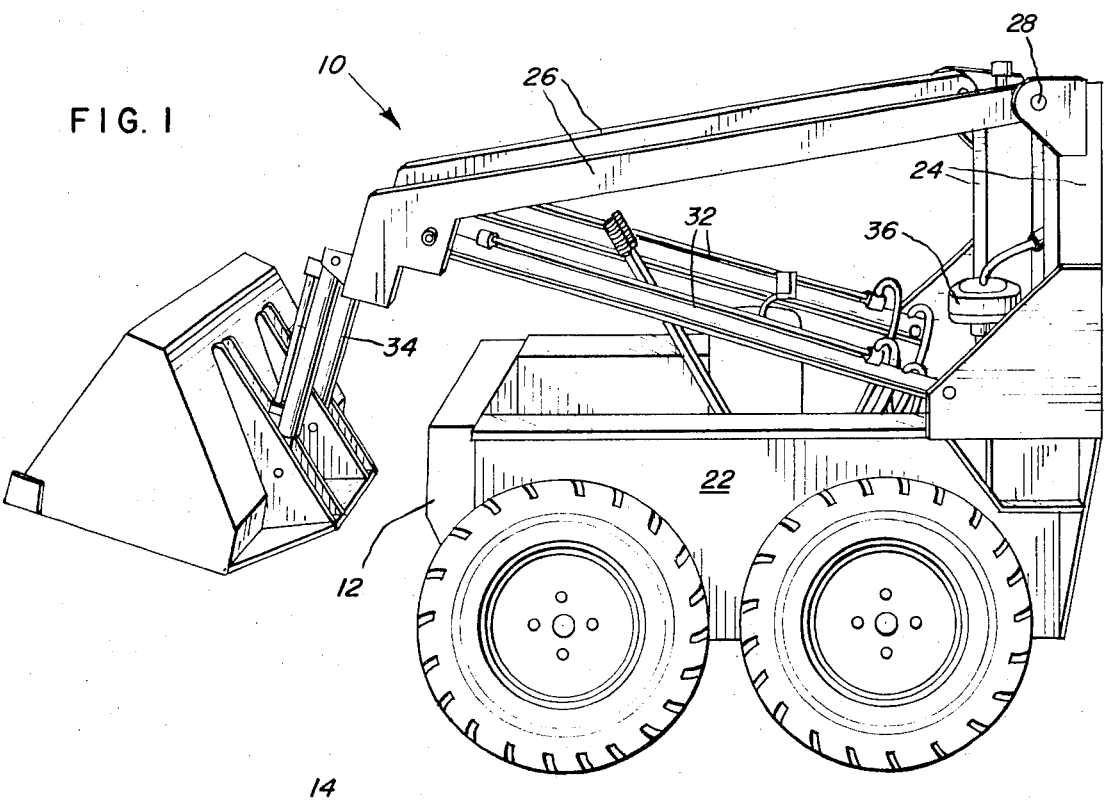
FIG. I
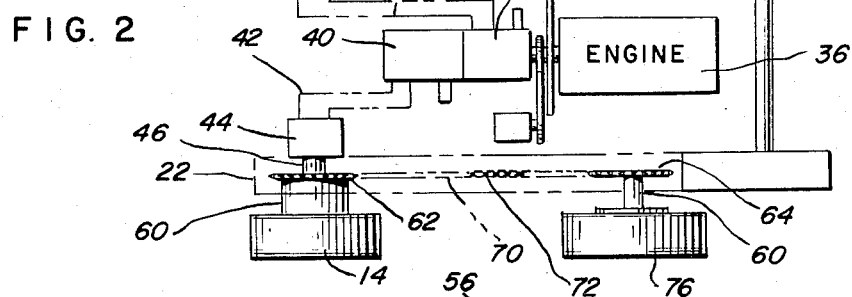
FIG. 2
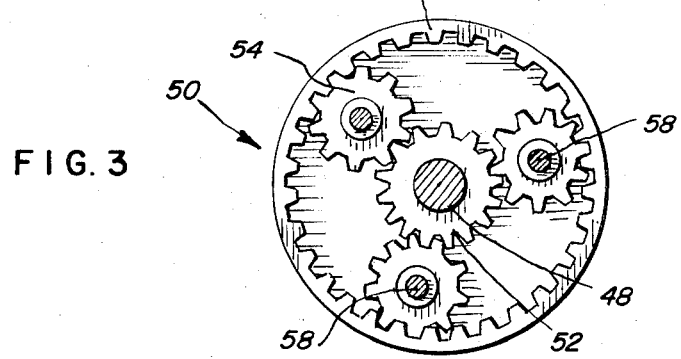
FIG. 3

HYDROSTATIC DRIVE ARRANGEMENT FOR VEHICLES

BACKGROUND OF THE INVENTION

Numerous vehicles of the track or wheel type have been proposed for performing various material handling operations. One type of vehicle that recently has received a remarkable degree of attention is a small unit wherein all four wheels of the unit are driven and the steering or turning movement is accomplished by driving the pair of wheels on one side of the vehicle in one direction while the second pair of wheels is either in a neutral condition or driven at a different speed than the first pair of wheels.

These vehicles have generally been referred to as skid-steer vehicles. One type of skid-steer vehicle that is presently commercially available incorporates fluid translating devices as the power train between the engine and the respective pairs of wheels.

Because of the competitive nature of such vehicles, the cost factor is an important item in determining the marketability of the vehicle. In order to maintain the cost at a minimum, it is customary to utilize fluid motors in which the output speed of the motor makes it necessary to have a speed reduction between the output shaft and the wheels of the vehicle. Usually this is accomplished by having a small drive sprocket on the output shaft with larger driven sprockets connected to the wheels. Such an arrangement to some extent limits the size of the vehicle because it is not economically feasible to get the proper speed reduction between the fluid motor and the wheels.

SUMMARY OF THE INVENTION

The drive mechanism of the present invention incorporates a fluid motor for each pair of wheels on the opposite sides of the body of the vehicle with the output of the fluid motors driving the front wheels of the respective pairs of wheels through planetary gear means and the second wheels of the pairs of wheels are driven from the first wheels.

In the specific embodiment illustrated, a ring gear of the planetary gear means has a hub forming part thereof with the front wheel being directly connected to the hub, which eliminates the need for stub axles for the front wheels of the vehicle. The drive means between the front wheel and rear wheel include a sprocket directly connected to the hub on the ring gear with an endless chain entrained over the sprocket and a second sprocket located on the rear wheel.

BRIEF DESCRIPTION OF THE SEVERAL VIEWS OF THE DRAWINGS

FIG. 1 shows a perspective view of a vehicle having the present invention incorporated therein;

FIG. 2 is a schematic plan view of the vehicle showing the drive train between the engine and the wheels of the vehicle; and FIG. 3 is an enlarged fragmentary vertical section showing the drive mechanism between the front wheel and the fluid motor.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a vehicle, generally designated by the reference numeral 10. Vehicle 10 includes a body 12 supported on opposite sides by first and second pairs of wheels 14 and 16. The body defines first and second compartments 22 which compartments house a portion of the drive mechanism to be described later.

Stanchions 24 project upwardly from the body on each side of an engine space that is located adjacent the rear end of the vehicle and a lift arm 26 is pivoted at 28 on the upper end of each stanchion. The lift arms project forwardly along the body and downwardly adjacent the forward end of the body with a material handling member 30, such as a bucket, pivotally connected to the forward ends of the respective lift arms.

Hydraulic fluid rams 32 are positioned between each stanchion and its associated lift arm so that the lift arms may be raised and lowered on the vehicle body. Also, hydraulic fluid rams 34 are located between the material handling member and the lift arms to pivot the material handling member relative to the lift arms.

Each pair of wheels 14 and 16 on the respective sides of the vehicle are driven through separate power trains which are identical in construction and only one will be described in detail. As shown in FIG. 2, the power train between engine 36 and a pair of wheels 14 and 16 consists of a fluid translating device or variable displacement pump 40 that is driven by engine or prime mover 36 and supplies fluid under pressure through conduits 42 to fixed displacement motor or fluid translating device 44. The housing of the fluid motor is secured to the side wall of compartment 22 through suitable means (not shown).

The fluid motor or translating device 44 has an output shaft 46 connected through a drive mechanism that allows for the reduction of speed between the output shaft and the input to the wheel so that any speed reduction can be achieved at a minimum cost.

This is accomplished by planetary gear means 50 (FIG. 3) between output shaft 46 and front wheel 14 of each pair of wheels. More specifically, the planetary gear means consists of a sun gear 52 fixed to output shaft 46, a plurality of planet gears in mesh with sun gear 52 and a ring gear 56 in mesh with the planet gears. Planet gears may be supported on a spider (not shown) by stub shafts 58. Ring gear 56 has a hub 60 integral therewith and the hub is rotatably supported in suitable bearing means (not shown) carried by the side wall of compartment 22.

The drive mechanism also incorporates means between each pair of wheels 14 and 16 for driving the second wheel 16 of each pair of wheels from the first or front wheel 14. This drive means is illustrated in FIG. 2 and includes a sprocket 62 fixed to the outer periphery of hub 60 and a second sprocket 64 secured to a stub shaft 66 that is rotatably supported in side wall of compartment 22 by suitable bearing means (not shown). The rear wheel 16 is directly connected to the stub axle 66 and an endless chain 70 is entrained over the two sprockets 62 and 64 so that the rear wheel is driven directly from the front wheel. Suitable idler sprockets 72 may be associated with the endless chain to produce the desired tension and compensate for wear of the chain.

With the drive mechanism described above, the front wheels 14 will be driven from output shaft 46 directly through the planetary gear means 50 which eliminates the need for a front axle or stub shaft for each of the front wheels. Also, the planetary gear arrangement provides greater versatility in the speed reduction that may be produced between the output shaft and the wheels.

The driving of the front wheels directly from the output shaft of the motors has an additional advantage in that the output from the shaft is supplied directly to the front wheels which require the greatest amount of power since the front wheels are located adjacent the material handling member. For example, if the material handling unit or bucket is being filled, the most power is desirably available at the front wheels.

As can be seen from the above description, the present invention allows for the use of less expensive fixed displacement fluid motors and still gain the desired speed reduction necessary between the motor and the wheels.

We claim:

1. Drive means for a vehicle having a body and two pairs of wheels respectively on opposite sides of said body, comprising: a fluid motor for each pair of wheels, each fluid motor having an output shaft; planetary gear means between each shaft and one wheel of each pair, said planetary gear means each including a sun gear fixed to the output shaft, planet gears in mesh with said sun gear and a ring gear in mesh with said planet gears; a hub secured to each ring gear, said one wheel of each pair being respectively secured to said hubs; and means respectively between the hubs and the other wheels of each pair for driving the other wheels of each pair of wheels.

2. Drive means as defined in claim 1, in which each hub has a sprocket secured thereto and said means between each pair of wheels includes an endless chain entrained over the sprocket and a sprocket secured to the other wheel of each pair.

3. Drive means as defined in claim 2, in which the one wheel of each pair is the front wheel for said vehicle.

4. Drive means for a vehicle having a pair of ground engaging wheels on each side of the body of said vehicle, said drive means comprising: a fluid motor for each side of said vehicle, each fluid motor having an output shaft; planetary gear means cooperating with each output shaft, said planetary gear means each having a ring gear, a hub integral with each ring gear, one wheel of each pair being connected directly to the hub of the associated planetary gear means; and drive means between the other wheel of each pair and the associated hub.

* * * * *